(12) United States Patent
Wondka

(10) Patent No.: US 10,421,595 B2
(45) Date of Patent: Sep. 24, 2019

(54) MULTI-COMPARTMENT SNACK STORAGE AND DISPENSING APPLIANCE

(71) Applicant: Anthony David Wondka, San Ramon, CA (US)

(72) Inventor: Anthony David Wondka, San Ramon, CA (US)

( * ) Notice: Subject to any disclaimer, the term of this patent is extended or adjusted under 35 U.S.C. 154(b) by 220 days.

(21) Appl. No.: 15/330,991

(22) Filed: Nov. 23, 2015

(65) Prior Publication Data

US 2018/0312321 A1 Nov. 1, 2018

Related U.S. Application Data

(60) Provisional application No. 62/083,250, filed on Nov. 23, 2014.

(51) Int. Cl.
*B65D 81/32* (2006.01)
*B65D 21/02* (2006.01)
(Continued)

(52) U.S. Cl.
CPC .......... *B65D 81/3205* (2013.01); *B65D 1/24* (2013.01); *B65D 1/265* (2013.01); *B65D 21/0206* (2013.01); *B65D 43/0212* (2013.01); *B65D 43/0231* (2013.01); *B65D 43/161* (2013.01); *B65D 47/12* (2013.01); *B65D 47/265* (2013.01);
(Continued)

(58) Field of Classification Search
CPC ............... B65D 81/3205; B65D 81/32; B65D 81/3879; B65D 81/3876; B65D 1/265; B65D 1/26; B65D 1/24; B65D 77/048; B65D 77/04; B65D 43/0212; B65D 43/0204; B65D 43/0231; B65D 43/0225; B65D 51/165; B65D 51/1644; B65D 51/1633; B65D 51/16; B65D 47/125; B65D 47/127; B65D 47/12; B65D 47/06; A47G 19/2272; A47G 19/2266; A47G 19/2225
USPC ....... 220/709, 705, 507, 532, 529, 526, 523, 220/592.17, 592.16, 592.28; 222/130, 222/129, 144, 135, 570, 567; 62/457.3, 62/457.2, 457.1
See application file for complete search history.

(56) References Cited

U.S. PATENT DOCUMENTS 2,948,453 A * 8/1960 Drown ................. B65D 47/283
215/388
4,607,755 A * 8/1986 Andreozzi ......... A47G 19/2266
215/229
(Continued)

FOREIGN PATENT DOCUMENTS

WO WO-2013138490 A1 * 9/2013 ......... A47G 19/2272

*Primary Examiner* — Robert J Hicks

(57) ABSTRACT

A food and beverage Appliance enables storage and consumption of a food and beverage snack, such as cereal and milk, in a portable form factor suitable to consume the snack while in motion or during or after traveling. The Appliance stores the food and beverage separately to preserve the crispiness and freshness. It dispenses the food and beverage separately and non-simultaneously to preserve the crispiness and freshness until tasting, and to allow the user to control exactly the size of each portion dispensed. The Appliance prevents leakage of the beverage out it its container, during filling, storage, traveling, or dispensing, to avoid getting the food soggy prior to dispensing and to avoid messes. It is also ideal for a use in and creating a new revenue category for restaurants and for pre-packaged retail applications.

20 Claims, 10 Drawing Sheets

(51) Int. Cl.
*B65D 77/04* (2006.01)
*B65D 1/24* (2006.01)
*B65D 1/26* (2006.01)
*B65D 81/38* (2006.01)
*B65D 43/02* (2006.01)
*B65D 43/16* (2006.01)
*B65D 47/26* (2006.01)
*B65D 51/16* (2006.01)
*B65D 47/12* (2006.01)
*B65D 85/80* (2006.01)

(52) U.S. Cl.
CPC ....... *B65D 51/1644* (2013.01); *B65D 77/048* (2013.01); *B65D 81/3879* (2013.01); *A47G 2400/062* (2013.01); *B65D 85/80* (2013.01); *B65D 2231/022* (2013.01); *B65D 2543/00046* (2013.01); *B65D 2543/00092* (2013.01); *B65D 2543/00296* (2013.01); *B65D 2543/00537* (2013.01); *B65D 2543/00629* (2013.01); *B65D 2543/00694* (2013.01); *B65D 2543/00731* (2013.01); *B65D 2543/00805* (2013.01); *B65D 2543/00972* (2013.01); *Y02W 30/807* (2015.05)

(56) References Cited

U.S. PATENT DOCUMENTS

| | | | | |
|---|---|---|---|---|
| 4,714,173 A * | 12/1987 | Ruiz | ............... | A47G 19/2266 220/709 |
| 4,899,902 A * | 2/1990 | DeMars | ............. | B65D 43/0212 220/254.3 |
| 5,467,877 A * | 11/1995 | Smith | ............... | A61J 9/00 215/11.1 |
| 5,762,231 A * | 6/1998 | Rider, Jr. | ............... | B65D 1/36 206/541 |
| 6,264,068 B1 * | 7/2001 | Ours | ............... | A47G 19/02 222/129 |
| 6,913,777 B2 * | 7/2005 | Rebhorn | ............... | B65B 29/10 206/217 |
| 7,063,229 B2 * | 6/2006 | Westerhof | ............. | A47G 19/02 220/506 |
| 7,975,868 B1 * | 7/2011 | Flies | ............... | B65D 1/24 215/12.1 |
| 8,485,378 B2 * | 7/2013 | Zoss | ............... | A47G 19/02 206/219 |
| 2016/0114942 A1 * | 4/2016 | Mussio | ............. | B65D 43/0222 222/144.5 |

* cited by examiner

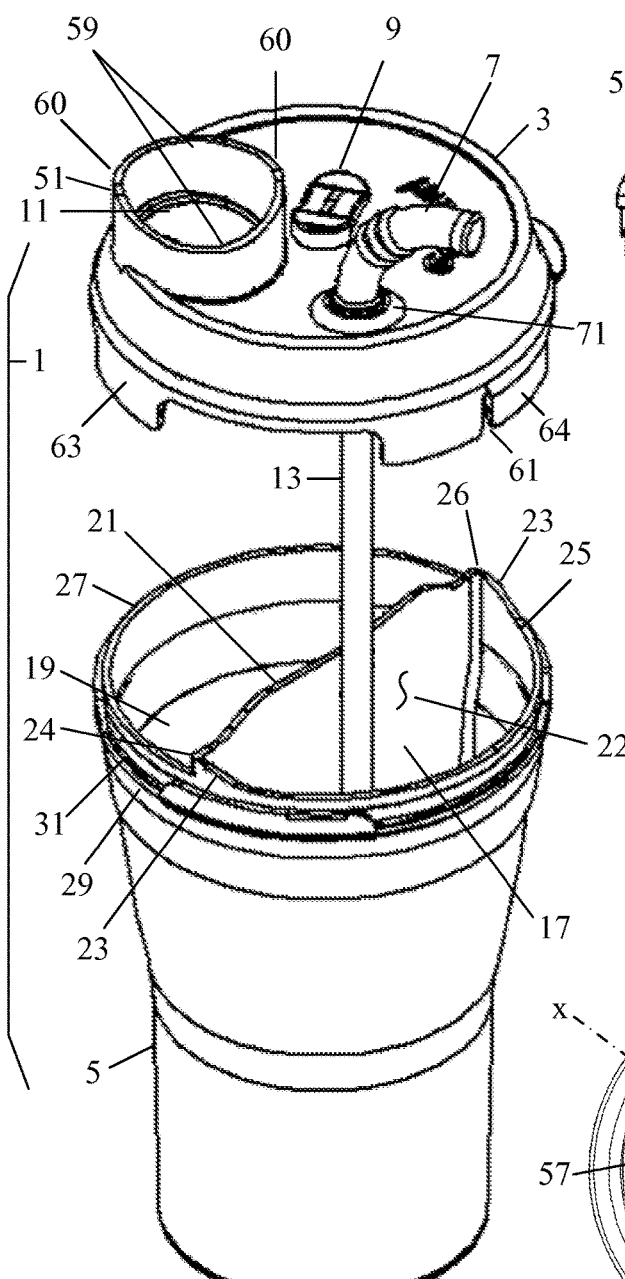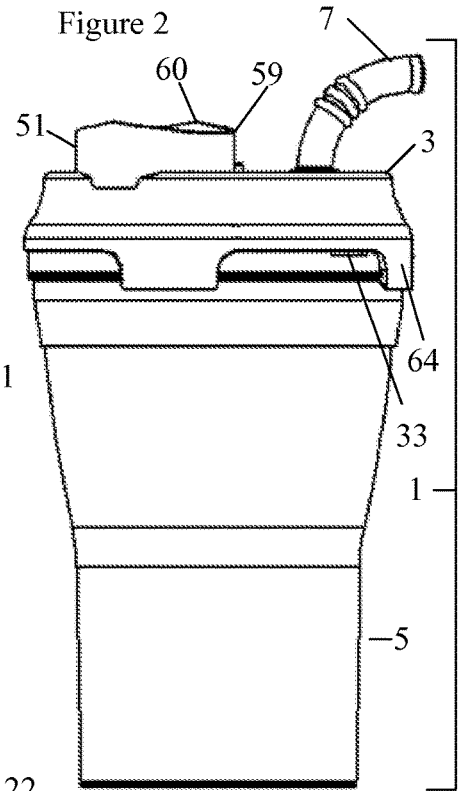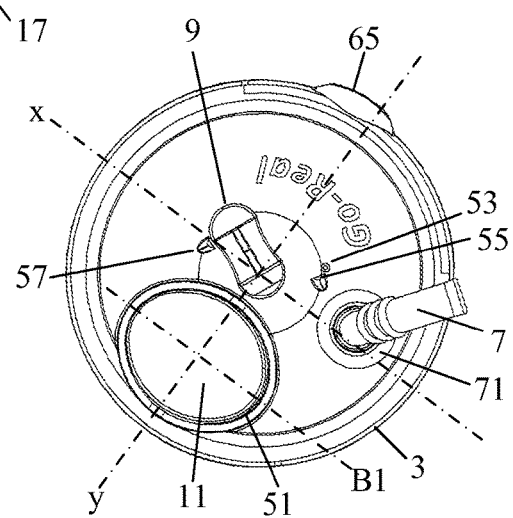

SECTION B-B

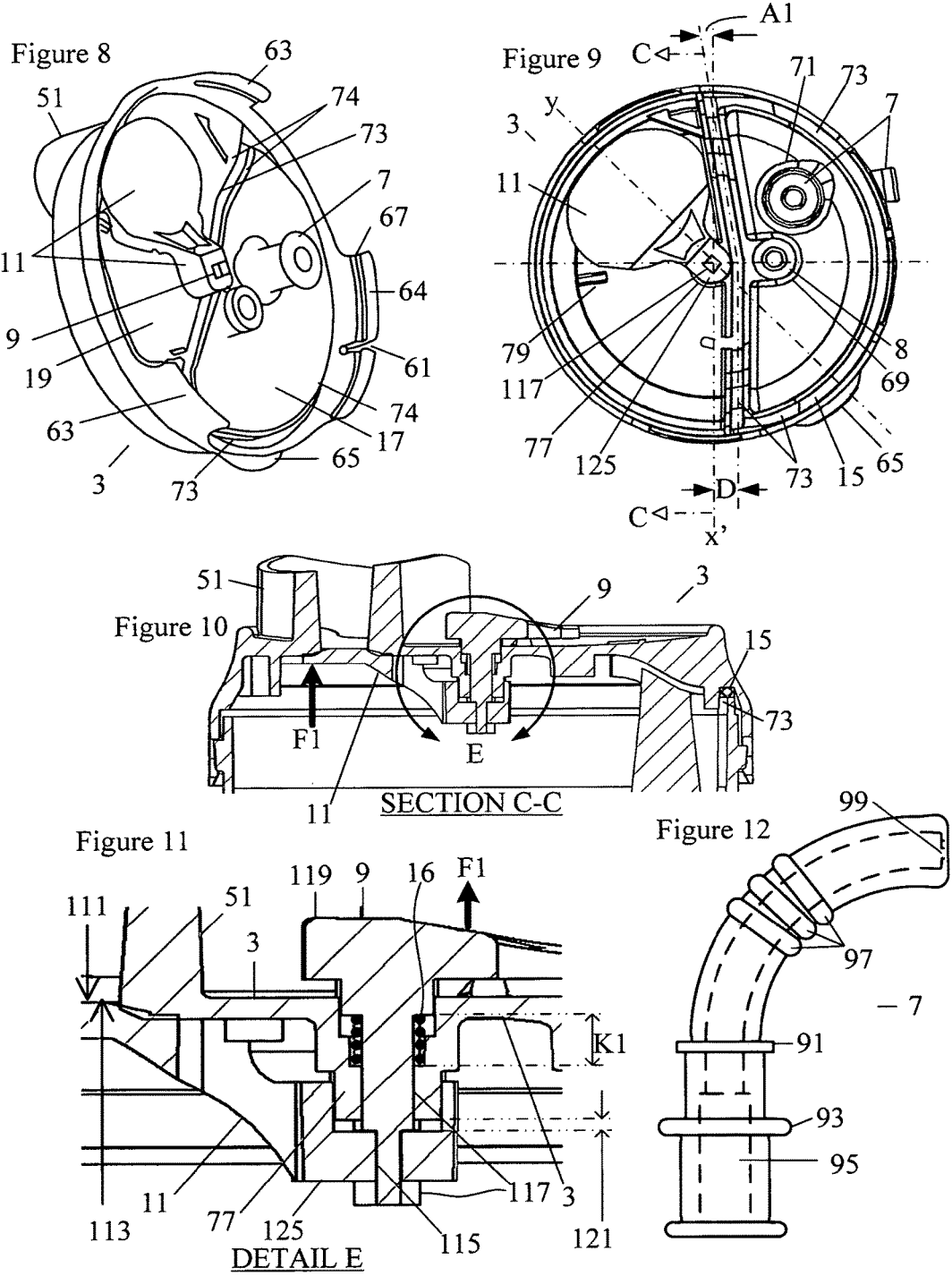

US 10,421,595 B2

MULTI-COMPARTMENT SNACK STORAGE AND DISPENSING APPLIANCE

CROSS-REFERENCE TO RELATED APPLICATIONS

This application claims priority to U.S. Provisional Application 62/083,250, filed Nov. 23, 2014.

BACKGROUND OF THE INVENTION

This invention relates to the field of food and beverage containers and dispensers. In particular the invention describes a container used to store a solid food and beverage separately, and used to dispense both separately during consumption. A favorite and healthy meal in many cultures is cereal with milk, frequently consumed for breakfast, and also consumed as a snack throughout the day. The popularity is highest with children, but also with adults because of the well documented health benefits. When the milk and cereal are mixed together, it must be consumed without delay for a fresh affect, otherwise the cereal becomes soggy and the meal loses its appeal. The popularity of the snack has caused people to devise ways to have the snack away from the home. Containers described in the prior art attempt to mix the milk and cereal together during the act of dispensing or prior to dispensing, or are complex to use, or require two hand operation to dispense. None of these prior art products have been successfully commercialized because of disadvantages such as the cereal becoming soggy from the milk, inability to mix in proper proportions, too complicated to use, and inconvenient, messy spills, or un-safe dispensing. Lifestyles around the world are evolving to be become (1) healthier, and (2) more on-the-go, so there is a huge need for a way to package a cereal meal to meet these evolving lifestyles, and this is a need that has not yet been met.

The mobile snack Appliance described in this invention solves the unmet need for portable storage and on-the-go consumption of a cereal snack while maintaining its freshness and crispiness. The invention specifically accomplishes the following: (1) allows mess-free and safe consumption of the snack during travel and movement, (2) allows storage of the snack for consumption later in the day, (3) prevents the cereal from getting soggy and preserves the freshness and crispiness after placement in the Appliance until the time of consumption, (4) allows mixing of the milk and cereal in the exact proportions desired by the consumer, (5) is easy and uncomplicated to use requiring only one-hand operation when dispensing, and (6) maximizes the convenience. As will be explained, the Appliance in this invention is the only Appliance known that can accomplish these much needed functional attributes.

BRIEF SUMMARY OF THE INVENTION

The Appliance in this invention has two separate compartments separated by a wall, in which the cereal and milk are stored in the separated compartments to prevent mixing and in which the cereal and milk are dispensed separately and non-simultaneously without mixing. The beverage compartment of the Appliance is completely sealed by unique functional elements in order to store, transport and dispense the snack without (1) allowing the milk to mix with the cereal which would ruin the snack, and without (2) spillage of milk out of the Appliance which would dirty one's belongings and clothing. Additionally the Appliance allows for (3) easy filling of the milk and cereal without accidental mixing which would ruin the snack, and for (4) easy one hand operation during dispensing and consumption so that the user does not need to concentrate on the task, for example as simple as drinking bottled water. Unlike other Appliances for cereal snacks which dispense the cereal and milk together, the cereal and milk are dispensed separately and non-simultaneously, thereby maintaining the separation of the two until in the mouth of the user, and therefore importantly maintaining freshness and crispness for as long as desired. When using the invention the user will dispense a desired portion of fresh crisp cereal into their mouth, then sip a desired amount of fresh, cold milk to mix with the cereal, then chew as required and swallow, and then repeat. The user can dispense the portions in the exact sizes and ratios desired. The experience maximizes the freshness of the snack and the user experiences a maximally fresh effect of the snack. When dispensing a portion of cereal, the Appliance is tilted to pour out the portion of the cereal, however, the milk will not leak when tilted so there is no mess whatsoever. When the milk is dispensed, it is done so with a self-sealing Straw, so the Appliance can be upright without tilting, so that the user doesn't have to perform a tricky or inconvenient maneuver with the Appliance when a portion of cereal is already in his or her mouth. The Straw includes a valve so that milk can only exit when the user actuates the valve. Novel and inventive functional elements, which will be described in the subsequent specification, accomplish the above unique functionality.

BRIEF DESCRIPTION OF THE DRAWINGS

FIG. 1 is an isometric exploded view of a main embodiment of the Appliance described in the invention.

FIG. 2 is a side view of a main embodiment of the invention.

FIG. 3 is a top view of the embodiment in FIG. 2.

FIG. 8 is an isometric view of the Lid assembly of the Appliance in FIG. 1.

FIG. 9 is a bottom view of the Lid assembly of FIG. 8.

FIG. 10 is a view of section C-C of FIG. 8.

FIG. 11 is a view of detail E of FIG. 10.

FIG. 12 is a hidden line side view of the Sip Valve piece of the Appliance in FIG. 1.

DETAILED DESCRIPTION OF THE INVENTION

Figure 4:
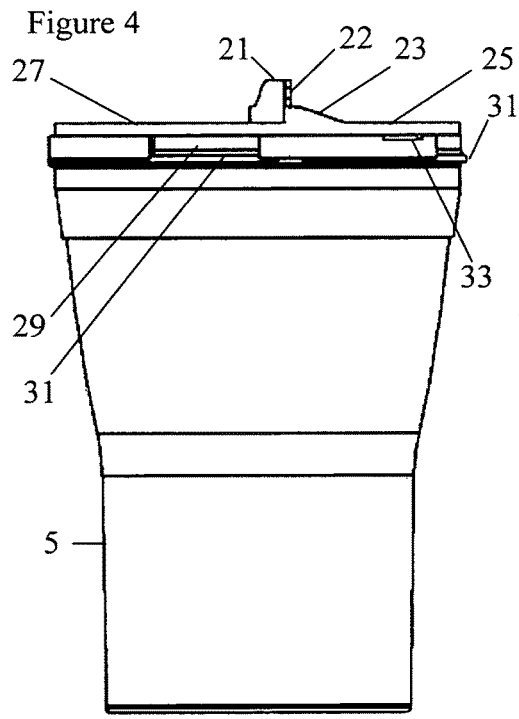
FIG. 4 is a side view of the Bottom piece of FIG. 2.

Described here are inventive features and functional elements of a snack dispensing Appliance, accomplishing the functional benefits, advantages and performance aforementioned. FIG. 1 describes a front isometric partially exploded view of the Appliance 1, with a Bottom Container 5, a Lid 3, a Sip Valve 7, and a Straw 13. The Bottom Container includes liquid compartment 17 typically used for milk, and solid compartment 19 typically used for cereal, and a wall 22 intersecting the Bottom Container to create the two compartments. To use the Appliance, the user fills the solid side with their favorite cereal or dry snack, and fills the liquid side with cold milk or their favorite beverage. The Lid is then snapped onto the Bottom. When eating the snack, cereal is poured out of the spout directly into the mouth. The user may chew the cereal a bit, then sip out a portion of milk through the Sip Valve, then chew a bit more, then swallow the cereal and milk together. The cereal and milk are dispensed separately and not simultaneously, and are not mixed before reaching the mouth. Prior art appliances attempt to mix the milk and cereal while being dispensed, or attempt to dispense the milk and cereal simultaneously, or attempt to mix the cereal and milk before reaching the mouth, all of which have significant disadvantages which the invention described herein solves. While consuming the snack, the Appliance does not need to be rotated between cereal dispensing and milk dispensing, since the spout 51 and Sip Valve 7 are directed in the same direction, allowing the Appliance to be operated easily by one hand, since the grip does not need to be adjusted. The Appliance can be filled immediately before the meal, or in advance. The Appliance can be used during travel and movement, can be packed for use later in the day, or can be used while stationary in place of the traditional bowl. After use, the Lid, Sip Valve and Straw can be disassembled for cleaning.

It is important that liquid never enter the solid compartment which is accomplished by the following: (1) The top of the separating wall 21 extends above the solid compartment rim 27; (2) The wall's top left and right corners, 24 and 26, are at a height (shown by datum 28 in FIG. 6) which is higher than the cereal compartment rim 27; (3) The top of the wall 21 transitions to left and right corners 24 and 26 with a gradual curve, and from the left and right corners 24 and 26 to the liquid compartment rim 25 with a ramp 23; (4) The liquid compartment rim (which is comprised of the top of the wall 21, the corners 24, and 26, the ramps 23 and the rest of the rim 25), is devoid of any steep transitions in height in order to define a substantially horizontal sealing surface onto which the Lid will seal. These features prevent liquid from splashing or spilling into the solid compartment, for example when filling the liquid compartment with the beverage, or if tilting the Appliance when attaching the Lid after filling, or when the Straw is inserted and raises the surface level of the beverage, or during transport of the Appliance after it is filled, or during dispensing the cereal or milk when consuming the snack. The Lid assembly has features to match with the Bottom Container liquid compartment rim which when attached creates a fluidic seal to seal the liquid compartment. It will be appreciated that the entire sealing rim encircling the liquid compartment, including the wall top corners 24 and 26 are allowed to protrude into a sealing groove on the Lid assembly because the entire rim protrudes higher than the rim of the rest of the Bottom Container. It is appreciated also that there is advantage of not including a fluidic seal around the cereal compartment rim since it is not necessary, and since it would require extra unnecessary size to the Appliance. Sealing function is focused on the liquid compartment. The unique configuration of the liquid compartment sealing rim creates a seal that seals reliably under the various use circumstances unique to this Appliance, denying milk from leaking to the outside of the Appliance or into the solid compartment. After filling and attachment of the Lid, the Appliance can be used without any leakage of spillage of beverage out of the liquid compartment, either into the cereal compartment, or outside the Appliance for example onto one's clothing.

FIG. 2 shows a front-side view of the Appliance of FIG. 1 with the Lid assembly connected to the Bottom Container. FIG. 3 is a top view of FIG. 2. Referring to FIGS. 1, 2 and 3, the Lid comprises a raised spout 51 around an opening 12 (shown in FIG. 15) to be aligned with the solid compartment. The spout is generally oval shaped with a long B1-axis which may be directed toward the user, and along its rim includes a dip 59 at the apex of the B1-axis, and a raised point 60 at the apex of a short y-axis, allowing the rim to conform to a user's lips. This orientation of the oval shaped raised spout with high points and dips on its rim, allows for optimal ergonomic function allowing the user to open the mouth more in the up and down direction which is more natural and comfortable when eating, compared to the side to side direction. The opening and spout are placed in a corner of the solid compartment in order for a spout Door 11 to fit within the solid compartment in both a closed and opened spout position as will be shown later in FIGS. 8, 9 and 15. Spout dimensions are important to the function of the Appliance. It must be large enough to allow popular cereals to pass through, it must be raised from the rest of the Lid a certain height to allow for nose clearance and so that eyesight is not obstructed by the Appliance when dispensing the cereal, and it must not be too large which would prevent the Door 11 from fitting within the solid compartment in both the closed and open positions. Without this raised spout, the user's nose would hit the top surface of the Lid, making it difficult to dispense the cereal into the mouth without spilling, and without the raised spout, the Appliance will obstruct vision when dispensing cereal. The spout dimensions are typically about 1.5" by 1.25" nominally in the long and short oval axis respectively, plus or minus ⅛", and typically about ⅝" and 7/16" high nominally at points 60 and 59 respectively, plus or minus ⅛". Shown in FIG. 3, the spout B1-axis may be oriented parallel to the x-axis. The Sip Valve 7 may be rotated inward toward the middle of the Lid, to position it for storage and transport. When ready to use, Sip Valve is rotated outward to be approximately parallel with the x-axis and the B1-axis, so that the Sip Valve and spout face the same direction, so that user can dispense the cereal and milk sequentially without requiring much rotation of the Appliance. This allows easy, one-hand and nuisance-free use allowing the user to easily switch between cereal and milk dispensing without needing to re-find the correct orientation each time.

The Lid also includes flex tabs 63 and 64 which fit within the keyways 29 of the Bottom, and which may flex outward to engage with the snap ring 31 on the Bottom. The flex tabs and keyways may be asymmetric so that the Lid can be engaged with the Bottom in only one rotational orientation to assure that the beverage compartment seal is aligned correctly and effective. The included angle of each flex tab is typically about 30-40 degrees, wide enough to give it ample clamping force against the Bottom, but not too wide to prevent overstressing when the tab is flexed outward to snap onto or off of the ring. A flex tab may include a flex slot 61 if the arc length of the flex tab is too long to allow proper flexing performance. A latch may also be included (not shown) between the top and bottom to increase the clamping force between the Lid and Bottom Container. The Lid also includes a lift tab 65 used to pry the Lid off of the Bottom, a vent port 53, and stops 55 and 57 to prevent over rotation of a Thumbwheel 9 which is used to open and close the Door 11. A notch 33 may be included to help pry the Lid off of the Bottom for example with a coin or kitchen utensil.

FIGS. 4 through 7 show the Bottom 5 in more detail. FIG. 4 is a side view of the Bottom, FIG. 5 a top view, FIG. 6 a front view and FIG. 7 a view of section B-B from FIG. 6. These figures show the wall 22, the top of the wall 21, the wall ramp 23, the wall top left and right corners 24 and 26 at a height at datum 28, the liquid compartment rim 25, and the solid compartment rim 27. There is no known prior art that has a compartment wall with corners 24 and 26 at a height higher than the rim 27, nor having ramps 23 connecting the raised wall corners to a rim 25.

Figure 5:
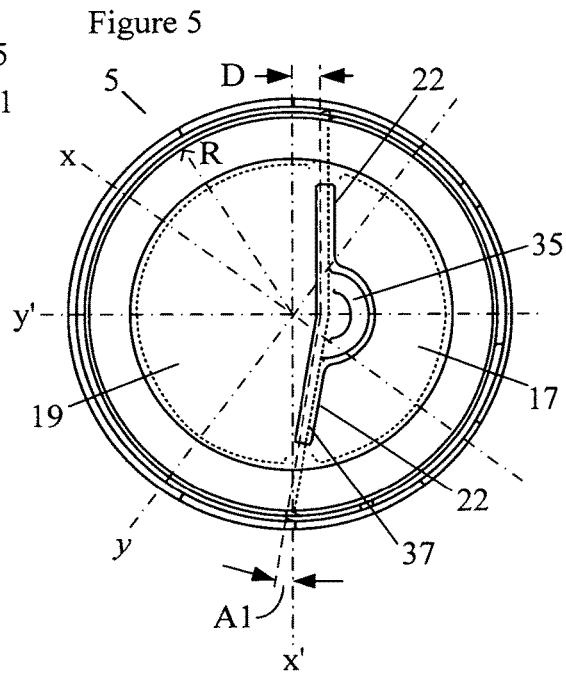
FIG. 5 is a hidden line top view of FIG. 4.
Figure 6:
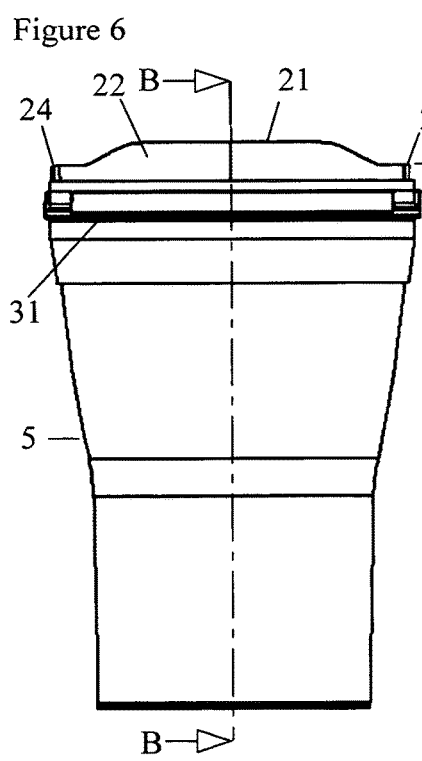
FIG. 6 is a side view of FIG. 4, rotated 90 degrees.
Figure 7:
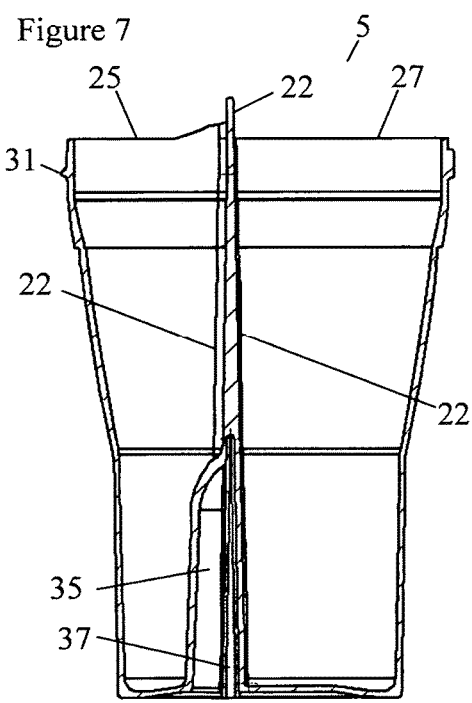
FIG. 7 is a view of section B-B of FIG. 6.

FIG. 5 shows the asymmetry of the separating wall 22 in more detail. The x'-axis bisecting the Bottom Container 5 geometry is substantially in the solid compartment 19. The separating wall 22 is generally offset from the x'-axis, biased to the liquid side 17, making the liquid compartment 17 smaller than the solid compartment 19 while still maintaining the correct amount of volume in both compartments. The offset-from-center wall also allows the food compartment to have just enough clearance for the spout Door 11 (FIG. 3) to be rotated between the open and closed spout positions, and little to no extra clearance for the door's two positions. A portion of the wall is parallel to and at a distance D from the x'-axis, and another portion of the wall may be at an angle A1 to the x'-axis. This asymmetric configuring of the wall and compartments accomplishes correct liquid and solid serving sizes and ratio, allows for the correct spout dimensions, and allows for a Door to fit within the compartment, all which are important to the function of the Appliance. The angled portion of the wall, defined by angle A1, decreases the area on the cereal side and increases the area on the milk side to create the correct milk:cereal volume ratio. Angle A1 is typically 8 to 12 degrees, and offset D is typically around ¼". The areas of the beverage side 17 and solid food side 19 are maximized so that the user can easily and conveniently pour both the cereal and milk into the Appliance without spilling, but while staying within the overall constraints and critical functional elements of the Appliance such as the spout, the liquid compartment sealing elements, and cereal to milk volume ratio. The areas at the top of the child size Bottom Container, are ideally within 15% of 5.3 square inches for the cereal side 19, and 3.64 square inches for the milk side 17, and with a width dimension along the y'-axis of greater than Radius R and within 10% of 2 inches of the cereal side and of less than Radius R and 1⅜ths inches for the milk side. The adult size Bottom Container is typically 20-33% larger in volume. In FIG. 6 a view 90 degrees from the FIG. 4 side view is shown, showing again the profile of the top of the wall 21 and the wall corners 24 and 26 at a height at datum 28 which is higher than the solid compartment rim 27. FIG. 7 is a view of Section B-B of FIG. 6. The bottom of the wall 22 includes a cold pack pocket 35 extending from the bottom into which a cold pack can be inserted to further keep the snack fresh during storage and traveling, and wing pockets 37 that are used to keep the Cold Stick in place as will be described later. The pockets 35 and 37 also improve the mold-ability of the wall.

FIGS. 8 through 11 show the Lid assembly 3 in more detail; FIG. 8 an isometric view of the bottom and FIG. 9 a bottom view. The Lid assembly includes a Spout Door 11, a Sealing Gasket 15, a Vent Valve 8 placed in a vent valve boss 69, a Sip Valve 7 passing through a sip valve boss 71, a Thumbwheel 9, and a thumbwheel and door hub 77. The flex tabs 63 and 64 include a snap ring groove 67 which engages with the snap ring 31 (FIG. 4) on the Bottom. The bottom of the Lid includes a Sealing Gasket 15 that sits in a gasket groove 73. The groove geometry matches the previously described geometry of the sealing rim of the Bottom Container in three dimensions. The groove walls 74 match the geometry of the previously described wall 22 (FIG. 5) of the Bottom Container, and divide the Lid into a liquid side 17 and a cereal side 19, which match up with the liquid and cereal sides of the Bottom Container. The center of the groove near the middle of the Lid is offset from the bisecting axis x' by D and at an angle A1, just like the Bottom Container wall 22 (FIG. 5). As explained previously, the Sealing Gasket division of the Lid into asymmetric liquid and cereal sides, and the angle A1, allows the Door thumbwheel spoke to pass through the Lid on the cereal side so that these features do not interfere with the liquid side which could create a leak path. Also, there is just the correct amount of space for the spout 51 and for the two positions of the Door 11 on the cereal side. And, the liquid and cereal side volumes are in just the correct ratio. It can now be appreciated that the cereal opening and spout are placed in a corner of the cereal side, and it can be appreciated that there is clearance in the cereal side of the Lid to rotate the Door to completely open or completely close the spout. It can further be appreciated that the inventive elements allow for a spout to dispense most cereals without clogging, allow for the correct volume and ratio of milk and cereal, and allow for a spout door to occupy an open and closed spout position without interfering with the milk side. It can also now be appreciated that the inventive elements embodied in the FIG. 1 Appliance has the absolute minimum number of individual components necessary to accomplish the required functionality, thus minimizing cost and enabling successful commercialization of this much needed consumer product.

FIGS. 10 and 11 are cross-section views of the Door mechanism. The spout Door 11 is shown in its resting position where the Door's top 111 is pressed against the Lid's bottom 113 with an exertion force of F1 generated by the Spring 16 which is in a compressed length K1 when at rest. A gap 121 exists between the Door hub 125 and the Lid hub 77 so that the Door is permitted to press against the Lid's bottom. The Thumbwheel spoke 117 has a catch 115 which catches the Door hub 125 so that when the Thumbwheel top 119 is pressed downward (not shown) it compresses the spring and moves the Thumbwheel spoke and Door downward to create a separation between the Door top 111 and Lid bottom 113. When pressed downward, the Door can be freely rotated between the spout open and closed positions. When the Thumbwheel top is not being pressed downward (as shown), the Spring pushes the Thumbwheel upward and the catch 115 pushes the Door top 111 upward against the Lid bottom 113. A detent 79 (FIG. 9) is provided to prevent inadvertent opening or closing of the Door.

FIG. 12 is a hidden line side view of the Sip Valve 7. There is a slit 99 at the top end of the Sip Valve, a Straw pocket 95 at the bottom end into which a Straw 13 (FIG. 1) is inserted, an upper and lower flange 91 and 93 to secure the Sip Valve in the through hole in the Lid above and below the boss 71 (FIG. 9), and ridges 97 that assist flexing of the Sip Valve and to add rigidity to prevent inadvertent compression and leakage. The Sip Valve is normally closed and opens when a vacuum is applied to it and or when the user compresses it with their lips or teeth, or both, which opens the slit 99 allowing the milk to flow out. The Sip Valve is typically made from a thermoset material such as silicone. The Sip Valve is typically angled or curved so that the user does not have to tilt the Appliance to sip the milk. The compliant material and flanges seal the Sip Valve to the through hole in the Lid, or above or below the Lid boss 71 (FIG. 9). The Sip Valve cross section is typically circular, but can be other profiles such as oval, and the inner flow channel within the Sip Valve is typically about ¼" diameter or effective diameter, but can range from ⅛" to ½". The Straw 13 can be detachable from the Sip Valve for cleaning.

Figure 13:
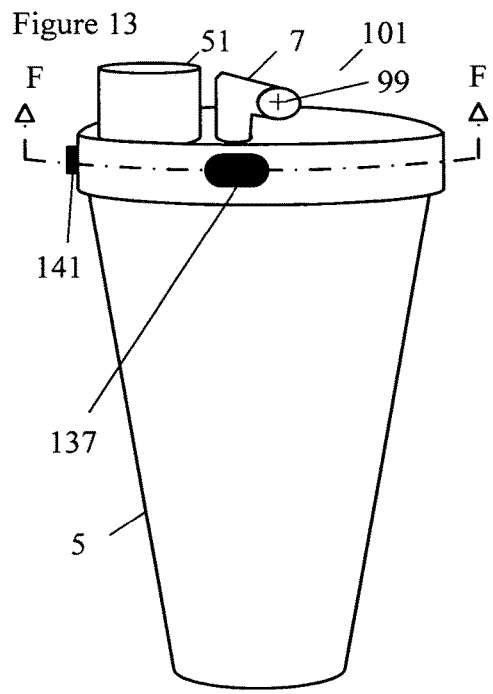
FIG. 13 is an isometric side view of the invention with a push button sip valve.
Figure 14:
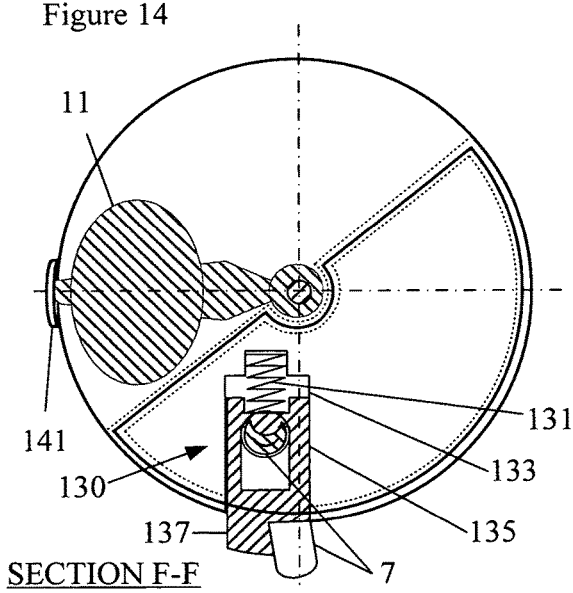
FIG. 14 is a view of section F-F of FIG. 13, with the push button not depressed.
Figure 15:
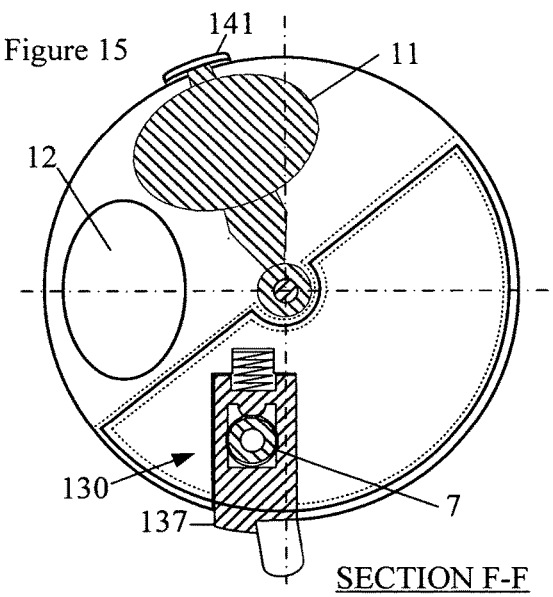
FIG. 15 is a view of the section F-F of FIG. 14 with the push button depressed.

The Appliance may include a secondary valve mechanism to close the Straw, as shown in FIGS. 13 through 15. In FIG. 13 the Appliance 101 is shown with a valve mechanism button 137 which closes the Straw 13 (not shown) or Sip Valve 7. FIG. 14 is section view F-F of FIG. 13 showing the valve mechanism 130 in the normally closed position. The mechanism includes a slide 135 which slides back and forth in a slide pocket 133, and a spring 131 which pushes the slide against the Sip Valve 7 to pinch the Sip Valve closed. As shown in FIG. 15, the valve push button 137 is pushed to push the slide inward in the slide pocket against the spring which un-pinches and opens the Sip Valve to allow milk to be sipped through the Sip Valve and out of the Appliance. The valve mechanism is preferred in applications in which the Appliance is subject to rigorous conditions, such as storing in a backpack, in which the closure of the Straw/Valve assembly must be accident-proof. FIG. 13 also shows an optional spout Door mechanism in which the Door 11 may be moved by a sliding lever 141 to open and close the cereal opening 12.

Figure 16:
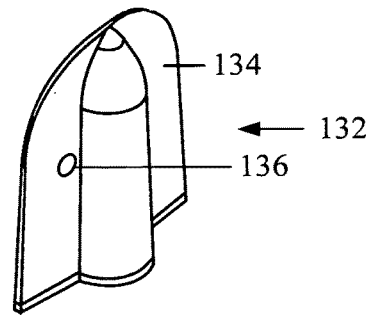
FIG. 16 is an isometric view of a Cold Stick used with the Appliance of FIG. 1.

FIG. 16 shows a Cold Stick 132 which slides into the cavity 35 of the Bottom shown in FIG. 7. The Cold Stick has wings 134 which flex and insert into the wing pocket 37 (FIG. 11 and which hold the Cold Stick in the cavity 35 with tension, and optionally a dimple 136 which holds the Cold Stick in place with tension. The Cold Stick and cold stick cavity are arranged so that they have substantially more surface area facing the milk compartment of the Appliance compared to the cereal compartment, typically at least 50% more surface area, in order to direct and transfer the coldness mostly toward the milk side. This preferentially keeps the milk side cool, and reduces condensation effects caused by the Cold Stick to the cereal side in order to keep the cereal dry and preventing it from becoming soggy from condensation. Optionally there may be a gap between the cold stick and the cereal compartment wall, but contact between the cold stick and the milk compartment wall, to preferentially direct the cold transfer to the milk side and not the cereal side. In an optional embodiment the side of the Bottom may include an indented pocket or a cavity into which a Cold Pack is inserted from the side. The Cold Pack may be held in place by an insulation Sleeve placed over and around the Bottom Container and Cold Pack.

Figure 17A:
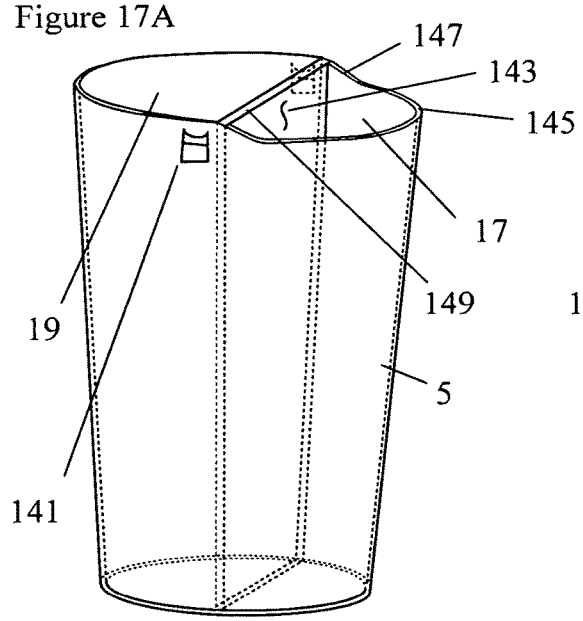
FIG. 17A is an isometric view of a Bottom piece of the invention with an alternative rim configuration.
Figure 17B:
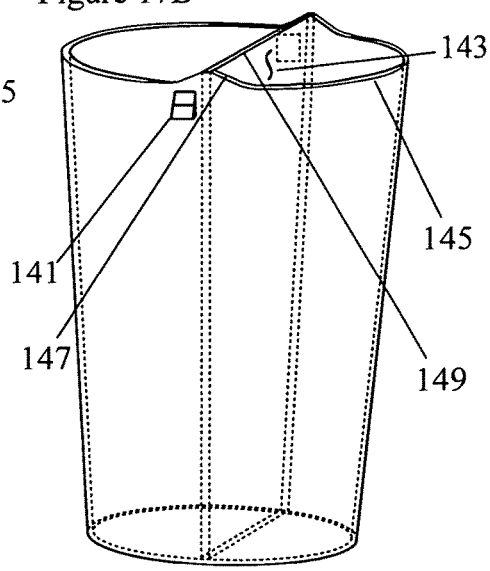
FIG. 17B is an isometric view of a Bottom piece of the invention with an alternative rim configuration.
Figure 18:
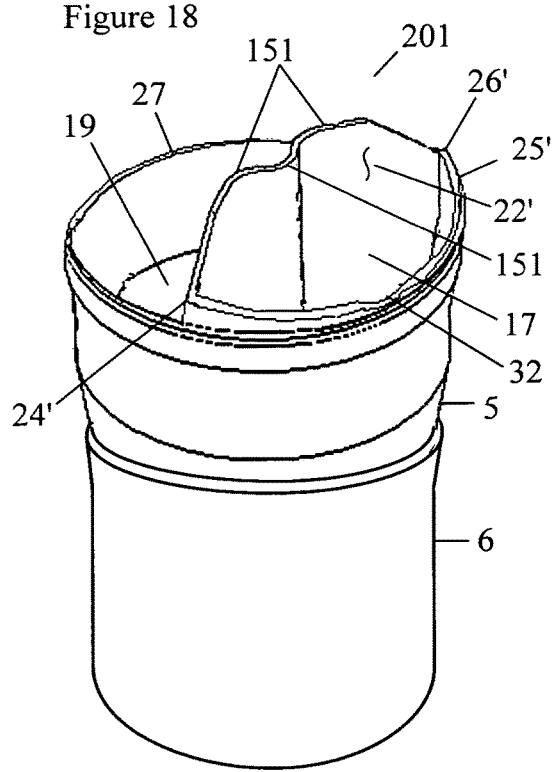
FIG. 18 is an isometric view of a Bottom piece of the invention with a non-linear compartment septum.
Figure 19:
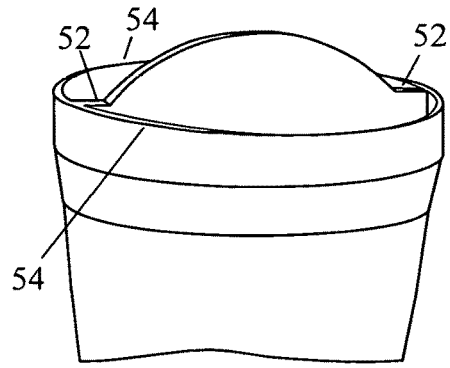
FIG. 19 is an isometric view of a prior art Appliance.

FIG. 17A describes an alternative rim geometry of the Bottom Container 5. The separating wall 143 top 149 is at a plane higher than the beverage compartment rim 145 at the compartment's radial perimeter, the wall top and perimeter rim connected by a ramp 147. The wall provides a backstop to prevent milk from spilling into the cereal compartment. A similar embodiment is shown in FIG. 17B in which the separating wall 143 top 149 is at a plane higher than the radial perimeters of both compartments. FIGS. 17A and 17B also show an alternative embodiment of a hook 141 that is used with a latch on the Lid to hold the Lid and Bottom Container together to maintain a seal. FIG. 18 shows an Appliance 201 with an alternate geometry of the separating wall 22' which has a compound curve 151 which separates the Bottom Container into two compartments. The wall 22', wall top corners 24' and 26', and rim 25' have the features and advantages previously described. In can be appreciated that the prior art that is closest to this invention, described in FIG. 19, has a separating wall but because the wall was conceived for a completely different use than the invention herein, the wall has a section 52 at the same height of the compartment rim 54, a feature driven by molding requirements, but a feature which would allow spillage of liquid from one compartment to the other when filling.

FIG. 18 also shows an optional embodiment of an Insulation Sleeve 6, which is typically comprised of a conforming material possessing thermal insulation properties, such as neoprene or EVA foam. The Sleeve may have an open bottom or closed bottom. The Sleeve may also possess a cooling substance to keep the Appliance cool. Another optional feature is shown, a spillway 32, to help prevent over-filling the beverage compartment.

Figure 20:
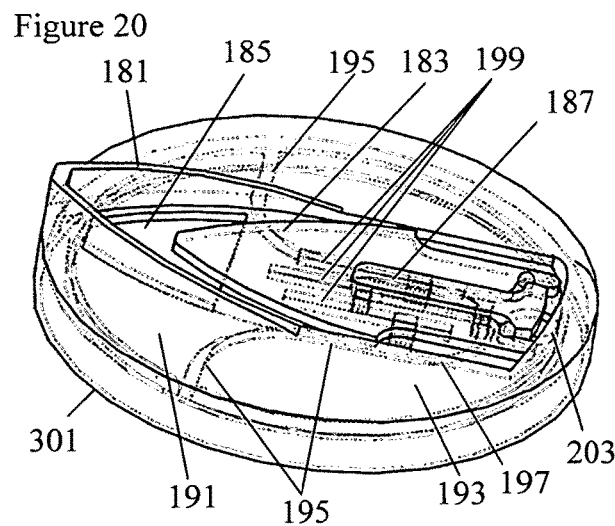
FIG. 20 is a hidden line isometric view of an alternative Lid Assembly of the Appliance with a triangular spout and a sliding Door and Straw closure.

FIG. 20 shows a hidden line isometric view of an alternate Lid 301 which includes a V-shaped opening 185 and raised spout 181 around the opening which slants downward from the front to the center for nose clearance. A sliding door 183 slides to open and close the cereal opening 185. A second slide 187 slides to pinch or un-pinch the Straw (not shown) which passes through the straw hole 203. The cereal side 191 and milk side 193 are divided by a sealing surface 195 that comprises a U-shaped curve 197. The sliding door 183 and second slide 187 slide back and forth in tracks 199 that are positioned on the cereal side 191 of the U-shaped groove, so that these features are not on the milk side 193 and therefore do not cause leaks on the milk side. In this embodiment the slides can independently open or close both the cereal spout and the Straw.

Figure 21:
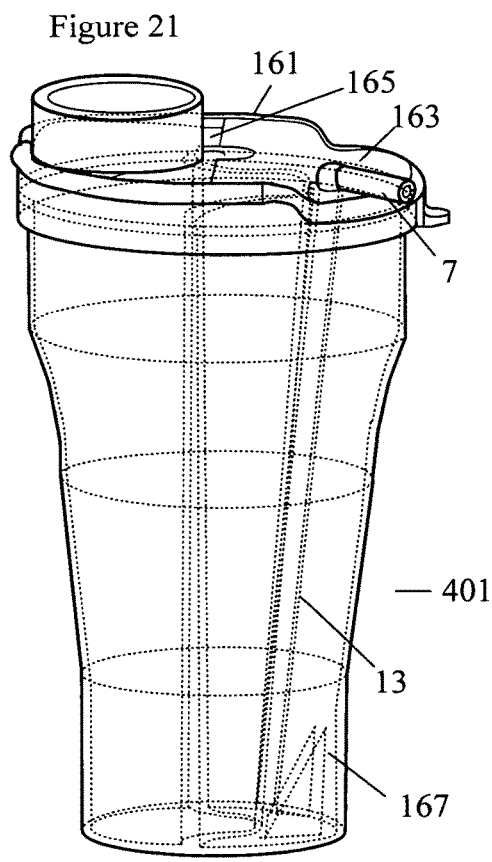
FIG. 21 is a hidden line isometric view of an alternative embodiment with a split level at the top.
Figure 22:
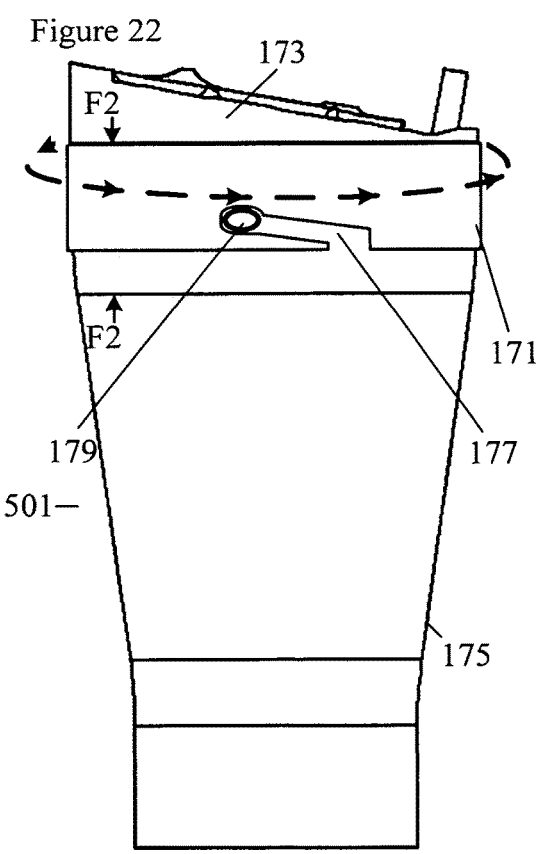
FIG. 22 is a side view of an alternative embodiment with a locking ring to lock and compress the Bottom piece and Lid Assembly together.

FIG. 21 shows an Appliance 401 of the invention with an alternative Lid assembly that has a split level top 161 in which the Lid's milk side 163 is lower than the Lid cereal side 165. This embodiment helps prevent milk from spilling into the cereal side, and raises the spout to make clearance for the user's nose. FIG. 21 also shows an optional embodiment of a ramp 167 on the bottom of the milk side to prevent inadvertent flow of milk through the Straw 13 when the Appliance is tipped. FIG. 22 shows an alternate Appliance 501 of the invention witl a locking ring 171 which can be rotated to lock the Lid 173 to the Bottom 175. The locking ring 171 is coupled to the Lid with a rotating joint, so that the ring can rotate freely about the Lid without the Lid also rotating. The ring 171 comprises a slot 177 and the Bottom a tab 179 so than when the ring is rotated, it pulls the Lid and Bottom together with a force F2 to compress the Sealing Gasket and maintain a leak-proof seal, while locking the Lid in place. This embodiment is especially useful in more rigorous applications when the seal must be accident proof. For example, when packing the Appliance in a cooler, lunch box or backpack, or when frequently reusing the Appliance, for example at a convenience store, restaurant, or coffee shop. FIG. 22 also shows an alternative embodiment in which the top of the Lid 173 is slanted ergonomically for nose clearance, reducing in height from the cereal side to the milk side.

Figure 23:
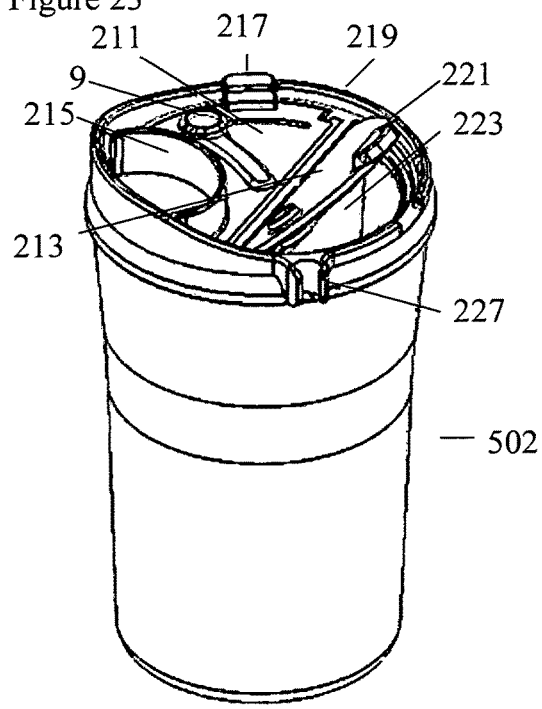
FIG. 23 is an isometric view of an alternative embodiment in which the Lid has hinged compartment Doors.
Figure 24:
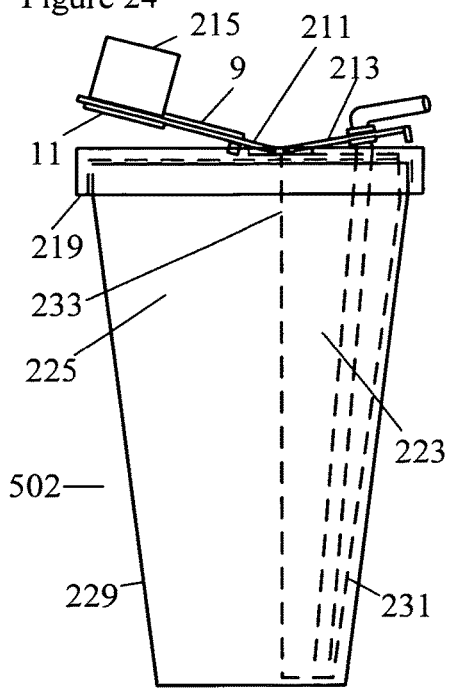
FIG. 24 is a hidden line side view of the embodiment shown in FIG. 22.

FIGS. 23 and 24 show an alternative Appliance 502 in which a milk container 231 is placed within a larger container 229, the remaining space in the larger container becoming the cereal compartment. This embodiment includes a Lid 219 with hinged Doors 211 and 213 for opening and closing the cereal compartment 225 and milk compartment 223 respectively. The Doors are hinged at the separating wall 233 which is part of the milk container 231, and snap closed against the Lid with snaps 217 and 221. A raised cereal spout 215 provides nose clearance and is open and shut with a Door 11 rotated by a Thumbwheel 9. An advantage of this embodiment is that the Lid 219 can easily seal with the rim of the milk container 231, and the Lid can attach to the bottom larger container more simply using threads or snaps, without worrying about the complication of the fluidic seal with the milk container. Also the doors help prevent milk from getting into the cereal compartment when filling. FIG. 23 also shows an optional embodiment of a straw clamp 227 which may be used to pinch the straw shut when not in use.

Figure 25:
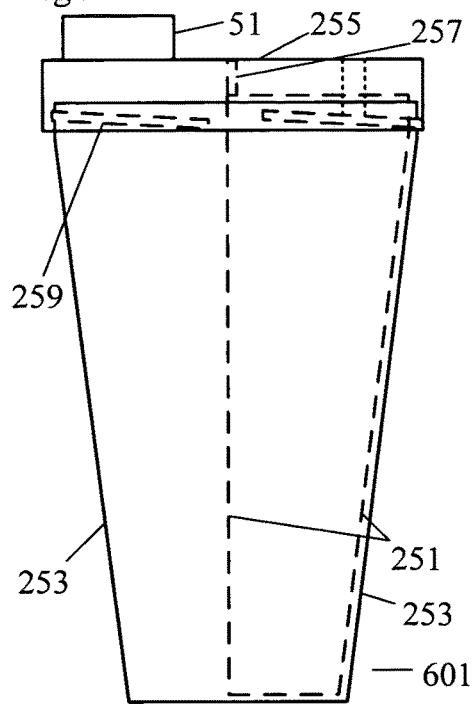
FIG. 25 is a hidden line side view of an alternative embodiment with a screw on Lid Assembly and a compartment within a compartment.

FIG. 25 shows an alternative Appliance 601, in which a separate Milk Container 251 fits within an outer Bottom Container 253, and a Lid 255 that snaps onto or screws onto the Bottom Container with threads 259. The milk container includes a wall 257 as previously described to prevent spilling of milk into the cereal compartment. The Lid is placed onto the assembled containers, and with sealing features on the bottom of the Lid, seals contiguously against the rim around the top of the Milk Container 251. Then, the Lid can be secured to the Bottom Container by rotation, since the Milk Container is rotatable within the Bottom Container, their radii be compatible as such. Optionally the Lid may initially form a partial seal against the rim of the Milk Container, and when rotated closed, compresses and completes the seal. The advantage of this embodiment is that (1) the parts are stackable or nest-able to facilitate distribution and retail logistics, (2) the Lid does not require any special rotational alignment making it more convenient to but on, (3) the threaded connection may increase the ease of use, (4) is easy to manufacture, and (5) is easy to disassemble and clean.

Figure 26:
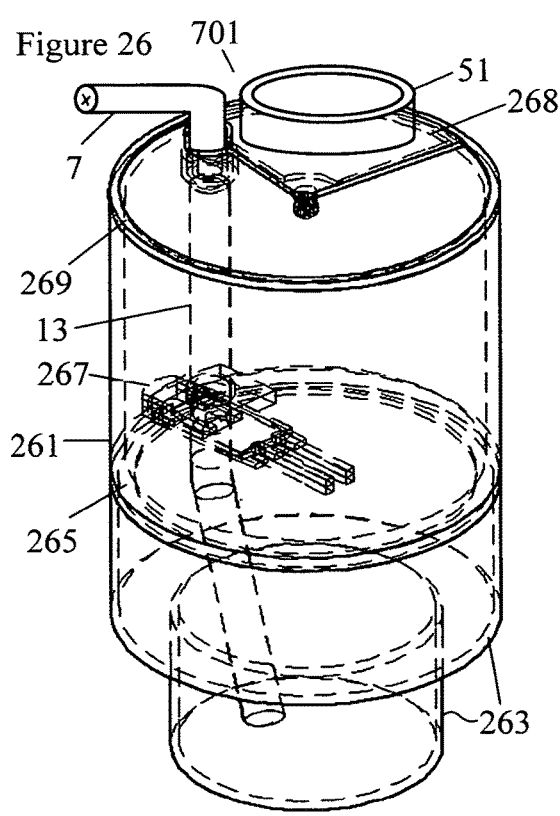
FIG. 26 is an isometric hidden line view of an alternate embodiment with a top and bottom compartment.

The invention also contemplates configurations in which the cereal and milk compartments are arranged one on top of the other, or combinations of side to side and top to bottom. FIG. 26 shows an alternate Appliance 701 in which the bottom of a Cereal Container 261 connects to the open top of a Milk Container 263. The Cereal Container bottom 265 includes a normally closed Straw closure valve mechanism 267, similar to that described in FIGS. 14 and 15. Once the Milk Container is filled with milk, the Cereal Container is snapped onto or screwed onto the top of the Milk Container, thus closing the top of the Milk Container. A sealing feature (not shown) on the bottom of the Cereal Container and/or on the top rim of the Milk Container fluidically seals the Milk Container when the Cereal Container is attached. A Straw 13 is typically pre-installed into the Cereal Container before it is placed onto the Milk Container, passing through the valve closure mechanism. A Lid 269 is placed onto the top of the Cereal Container after it is filled with cereal. A Sip Valve 7 may be attached to the Straw 13 sticking out above the Lid, or the Lid may include the Sip Valve which connects with the Straw when the Lid is placed on the Cereal Container. The Straw may have couplings for disassembly and cleaning. A raised dispensing spout 51 provides the advantages previously described. Alternatively, a rotating door 268 which may include the raised spout 51 opens and closes a large opening through which the cereal can be poured in.

Figure 27:
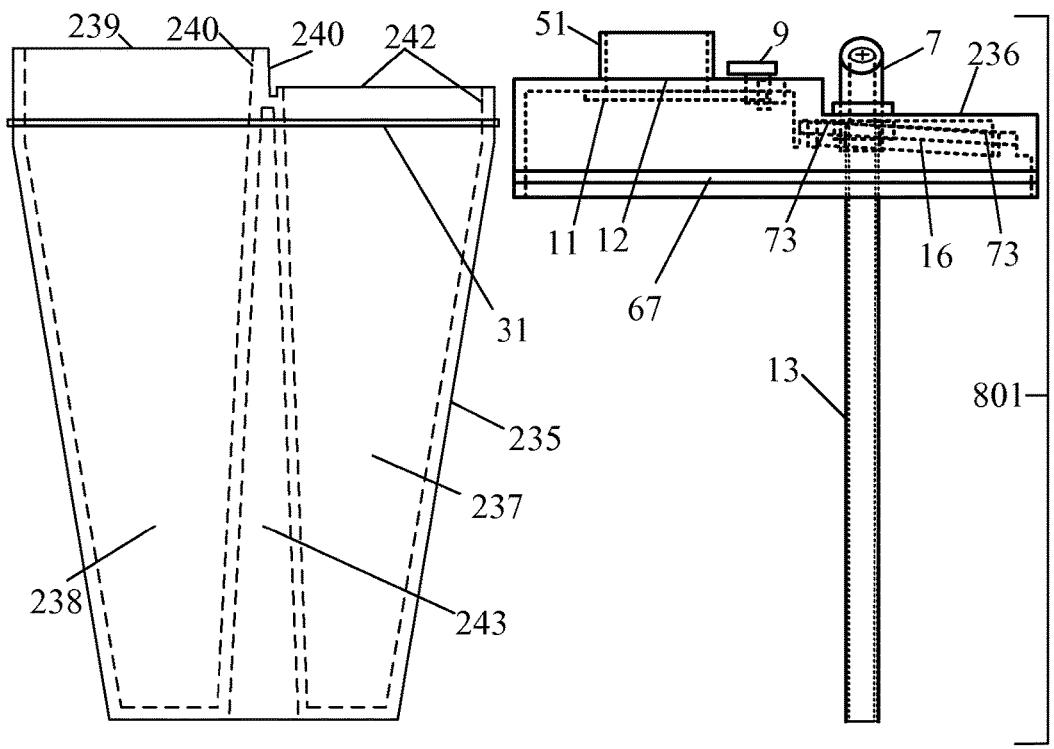
FIG. 27 is a side hidden line view of an alternate embodiment with a Bottom piece with a split level top.

FIG. 27 is a hidden line front view of an alternative Appliance 801 with a Bottom 235 having a beverage cavity 237 and a solid food cavity 238, separated by a septum 243. The septum may be solid or filled with material, or may be open space. The top rim 242 of the beverage side may be at a level lower than the top rim 239 of the solid food side. A wall 240 separates the beverage and solid cavities where their walls join together at the top of the Appliance, and the wall 240 extends above the top rim 242 of the beverage side. A Lid Assembly 236 is configured with a sealing groove 73 which encircles the sealing rim around the top of the beverage cavity. A sealing groove in the Lid mates with the top rim 242, and a Gasket 16 placed in the sealing groove creates the leak-proof fluid seal. The Lid and Bottom snap together with a groove 67 and ring 31, or optionally a latch. The Lid Assembly may also include an opening 12 and spout 51 for food dispensing, a Door 11 and Thumbwheel 9 to open and close the opening 12, a Straw 13 and normally closed Sip Valve 7. Alternatively the Bottom 235 can be a two part assembly; an inner dual cavity container that is placed into an outer shell, in order to make the container parts completely stackable.

Figure 28:
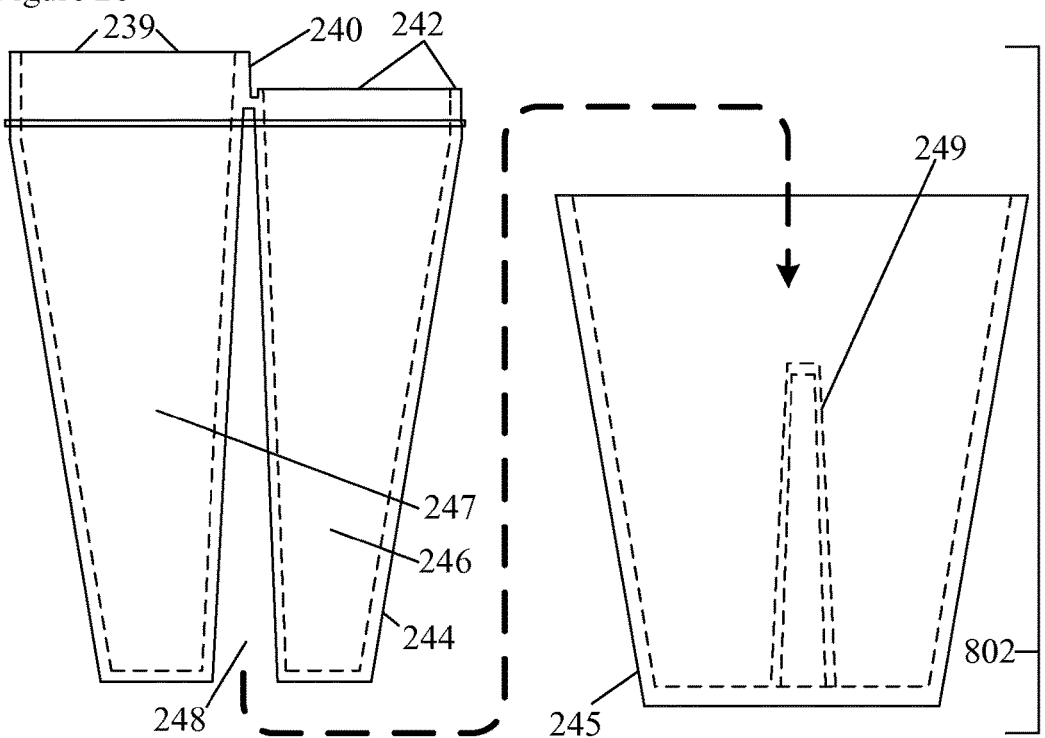
FIG. 28 is a side hidden line view of an alternate embodiment with a Bottom piece in which two compartments are separated by a cavity which is open from the sides.

FIG. 28 is a hidden line front view of an alternative bottom section 802 of the Appliance 801, with Bottom 244 having an open hollow space 248 separating a beverage cavity 246 and solid food cavity 247. The open hollow space is open from the bottom and the front and back, to facilitate easy molding of the Bottom, and stack-ability during transit and storage. For structural integrity of the Appliance, a Sleeve 245 is placed over the Bottom from the bottom closing up the open cavity, which also keeps the Bottom cavity clean, provides thermal insulation, and makes the Appliance aesthetically pleasing. The Sleeve is typically a compliant material such as neoprene foam, however can be a structural material such as stainless steel. The Sleeve can include a protrusion 249 which contains a cooling substance and which extends into the Bottom cavity 248. The cooling substance keeps the milk cold and the snack fresh, and may be biased toward the beverage side 246 of the Bottom to direct the cooling to the beverage side. The protrusion 249 may be removably attachable to the Sleeve. Optionally, a separate Cold Stick similar to that shown in FIG. 16 may be inserted into the cavity 248, then held in place by an Insulation Sleeve.

Figure 29:
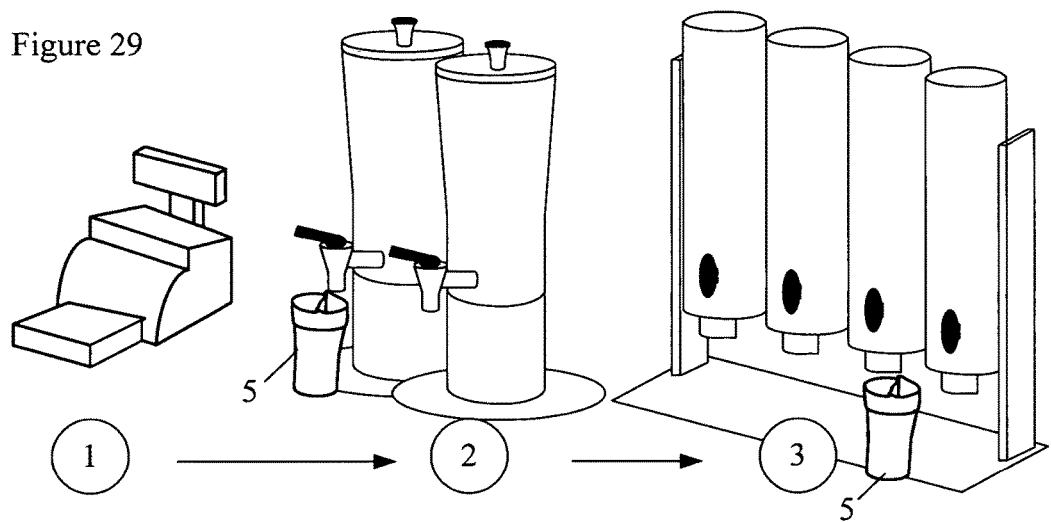
FIG. 29 is a schematic of a business model application of the invention, using the appliance in a restaurant.

Also contemplated in the invention is a new and novel business method or process facilitated by the device. The business method includes the steps of a restaurant selling the Appliance, then selling the meal either together with the Appliance or separately when the customer returns with the Appliance. After selling the meal, either the restaurant employee can fill the Appliance with the type of beverage and food requested by the customer, or a self-serve dispenser can be used for the customer to fill the Appliance him or herself. Additionally, the business method aspect of the invention contemplates ordering of a milk and cereal snack at a fast food restaurant, and consuming of the snack in the automobile. And finally, the business method aspect of the invention contemplates food companies selling pre-filled compartments described in the invention through grocery store retail locations. FIG. 29 depicts a business process application of the invention in which a restaurant has a cereal and milk counter at which the Appliance is filled with the user's choice of cereal and/or milk. In this aspect of the invention, the Appliance may be purchased separately, and a meal is purchased each time the customer returns (Step 1), milk is poured into the Appliance (Step 2) and cereal is added to the Appliance (Step 3). Filling may be done by the customer or by the barista. Payment can be automatic, or be made to a barista.

Figure 30:
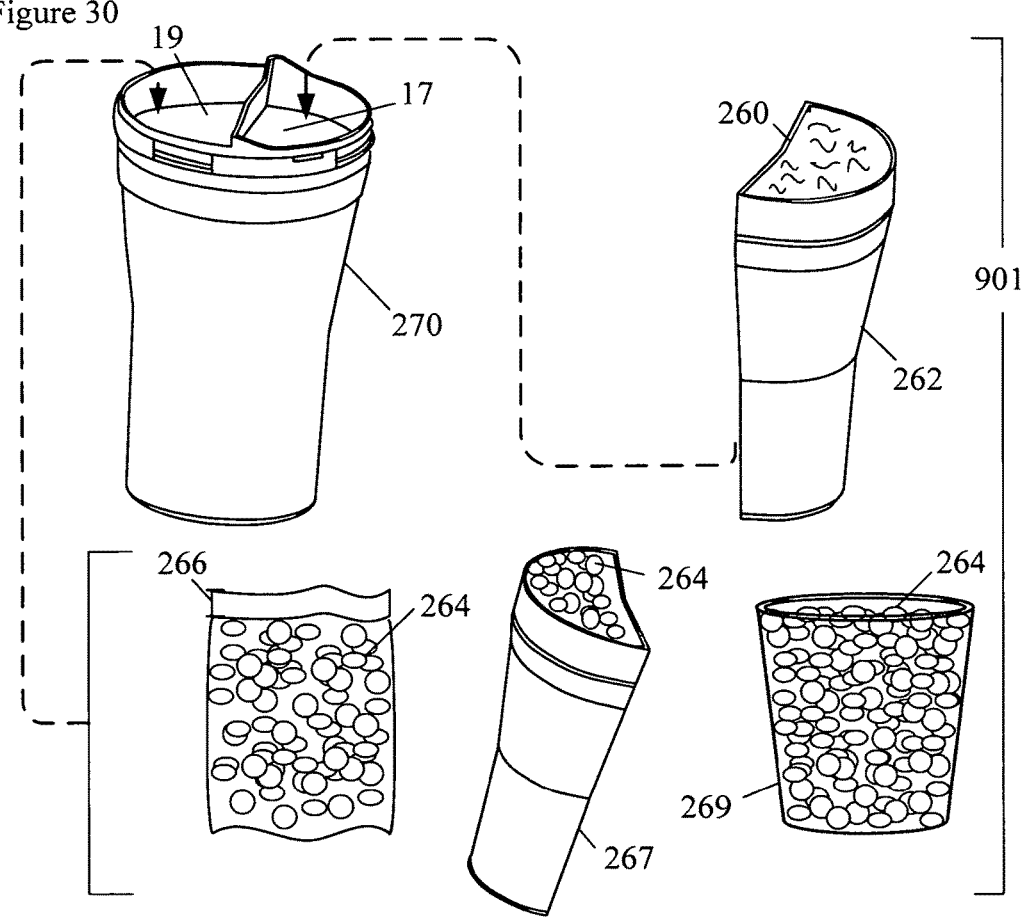
FIG. 30 is an isometric view of an alternative embodiment with a separately provided insert-able beverage container and a separately provided dry snack package.

It should be noted that the Appliance can be used for other solid foods and beverages besides cereal and milk. For example, dried fruits and nuts or dry trail mix can be placed in the solid compartment, and juice in the liquid compartment. Typically, the solid food, whether cereal or some other food, is in pieces with a maximum dimension of ½" to ¾". Larger food pieces can also be used by simply breaking into smaller pieces prior to placing into the Appliance. In FIG. 30 the Appliance 901 is used for a blended beverage such as a "smoothie", a milk shake or a protein shake, along-side a solid snack, such as trail mix, nuts, dried fruits, cereal or granola. The beverage compartment of the Appliance when used for smoothies is typically larger than the dry snack compartment, however, the dry snack spout and spout door still fit within the dry snack compartment due to an overall larger diameter that is typically used for this particular application. In an optional embodiment the beverage 260 can be served in a disposable paper or plastic container 262 that matches the beverage compartment of the Appliance, and the dry solid snack 264 can be served in a pre-packaged plastic bag 266, disposable cup 269, or a container 267 that matches the dry food side of the Appliance. The user then places the beverage container 262 into the beverage side 17, and transfers or places the dry snack into the food side 19 of the Appliance Bottom 270, then attaches the Lid with Straw and Valve (as shown in FIG. 1). Optionally the user can serve themselves at a self-serve dry food bar and a blended beverage dispenser, either with or without the plastic container 262 and bag or cup 266 and 269, as shown in FIG. 29. This embodiment is useful for deployment through take-out restaurants such as a juice shop, coffee shop or health food shop. The shop for example may sell the reusable Appliance which the customer bring back to the shop each time they return, and the shop will then sell the consumable meal when the customer returns. The shop barista need not touch the customer's previously purchased Appliance to maintain the shop's hygiene and cleanliness. In the case of this embodiment, the straw closure mechanism may be the mechanism 130 shown in FIG. 14. Or, the Sip Valve may have larger dimensions to accommodate the relatively thick beverage, typically ⁵⁄₁₆" to ⅜" effective inner diameter and with a slit 99 of about ¼" long in the slit's maximum dimension. For adult use, the Appliance in this embodiment typically has a serving size of 28 to 32 ounces, with 18 to 24 ounces for the blended beverage, and 10 to 16 ounces for the solid food. A child size has a serving size of 18 to 22 ounces. It should be noted that in the embodiment shown in FIG. 29, the beverage and food containers can be sold separately and pre-filled with a variety of choices, in which case the containers 262, 266, 267 or 269, will be sealed, and the user after purchase places the containers into the reusable Appliance, removes the seals, attaches the Appliance Lid, and is then ready to enjoy the snack.

Figure 31:
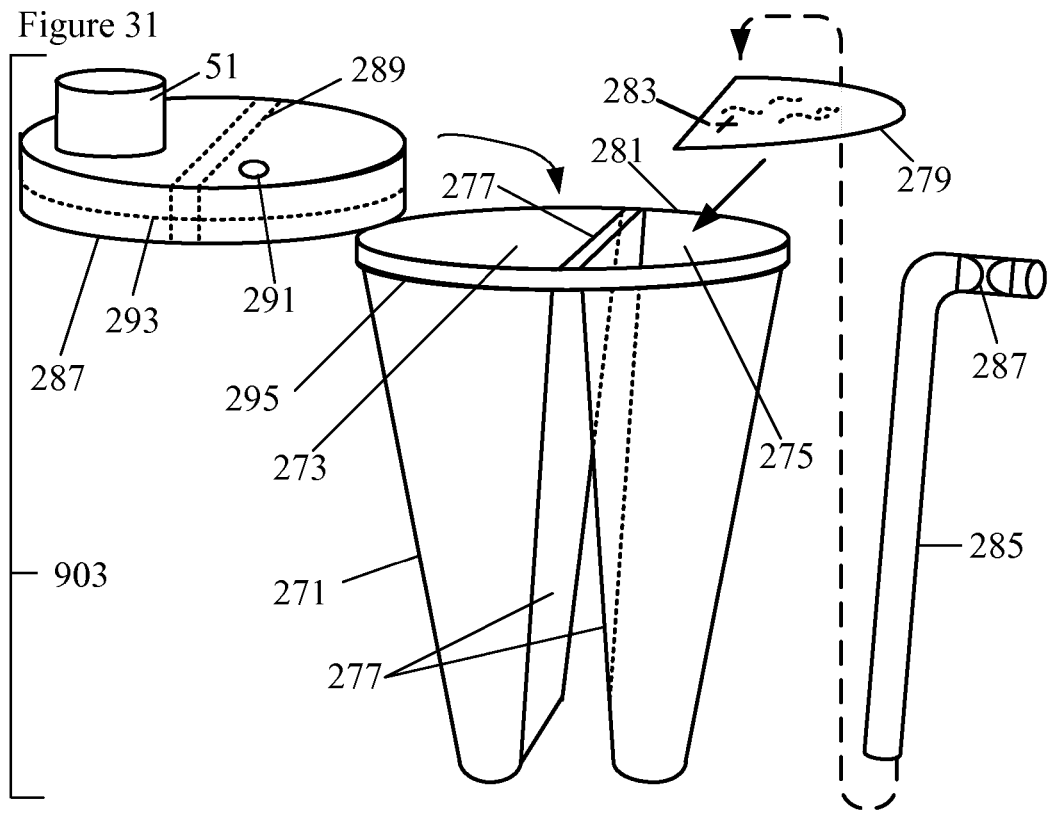
FIG. 31 is an isometric hidden line exploded view of an alternative embodiment intended for stack-ability and disposable use.
Figure 32:
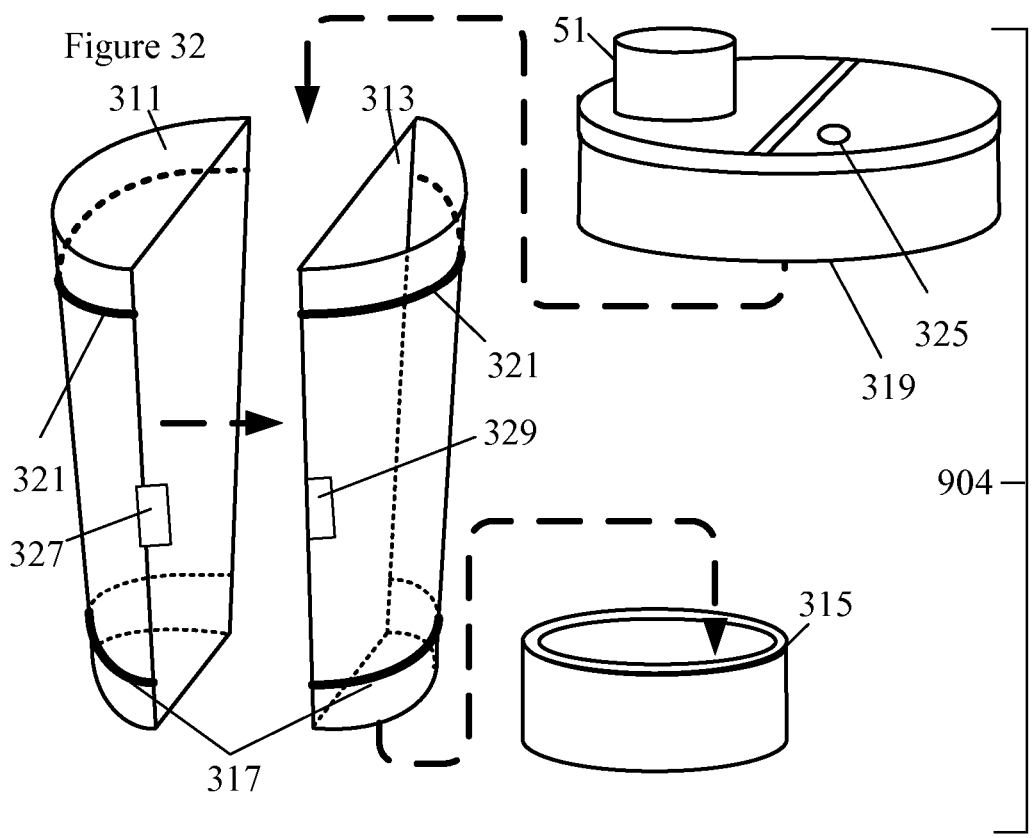
FIG. 32 is an isometric hidden line exploded view of an alternative embodiment intended for stack-ability and disposable use.

FIGS. 31 and 32 show additional embodiments of the invention with stackable and disposable features to enable mass market distribution and retail applications. This is particularly advantageous for take-out restaurants and breakfast shops, such as fast food restaurants or coffee shops, or for large food companies to pre-package cereal and/or milk in the Appliance such that the consumer can purchase it ready to use. FIG. 31 shows an Appliance 903 with a stackable container 271 with two cavities, the left cavity 273 for cereal and the right cavity 275 for milk, the cavities tapered from top to bottom to allow nesting. The container can be inexpensively made with blow molding, injection molding, or vacuum forming, using an appropriate plastic such as that used for water bottles, and ideally from a biodegradable plastic made from vegetable product. Or the container can be made from paper or pulp using paper cup forming techniques. A film 279 is placed on the top of the right cavity 275 of the container, and heat fused or adhered to the rim around the top of the right cavity. If the container is filled with milk at the point of use, the film can be applied after filling, in which case the film does not need to be fused to the rim, and it can act as a gasket for sealing once the Lid is snapped to the container. The Film may be a soft, compliant material and may include a score 283 which can be penetrated later by a Straw 285. A Lid 287 comprises a raised cereal spout 51 as previously described, a keyway 289 to align the Lid to the container which may also seal against the top of the septum 277 in the container between the two cavities, a hole 291 which aligns with the score 283 and through which the Straw is passed, and a snap groove 293 that snaps onto the sealing ring 295 on the container 271. The Straw may include the embodiments previously described, or may have a normally closed pinched wall area 287 which is closed to liquid flow until the user bites down on the area which spreads the pinched walls apart to allow milk to flow when a vacuum is applied during sipping. After use, the Appliance can be responsibly disposed of, or reused a limited number of times before some of the important features and functionality wears out. The stackable design and disposability lends itself to high volume deployment, allowing on-the-go use of healthy snacks just as ubiquitous in today's society as sodas are.

FIG. 32 shows an embodiment that enables stackable storage, low cost manufacturing of components, and responsible disposability in which the Appliance 904 includes two separate containers, 311 and 313, one for milk and one for cereal, each tapered from top to bottom for stack-ability. The containers can be different in shape, or identical in shape, and are designed with a taper to make them entirely stackable. The two containers may include a mating key way feature 327, 329 to help join them together prior to use. The two containers are held together by a Bottom Piece 315 which snaps over the bottom of the containers by snapping onto a lower snap ring 317. The Bottom Piece 315 may also be an insulation sleeve as previously described. The milk container can include a film after it is filled with milk, or a sealing film applied before use as described in FIG. 31. A Lid 319 snaps onto the upper snap ring 321 on the two containers and seals the top of the milk container using embodiments previously described. The Lid includes a self-sealing through hole 325 aligned with the milk container for a Straw/Valve assembly. The containers can be prefilled or filled at the time of preparing the meal, as previously described. The pieces can be vacuum formed, blow molded, injected molded, or formed using paper forming techniques, and may be made from a responsibly disposable material such as vegetable product plastic, paper or pulp.

An Insulation Sleeve, like shown in FIG. 18, may be included with the Appliance and is typically soft to aid in gripping, and can be decorated and available in options, and can even be customized by the user as desired. A template can be provided with the Appliance when purchased, so that the user can use the template to cut and sew their own sleeve using materials available at craft stores and then decorate it to individualize it. Electronic templates can be available, and plain sleeves can be available for custom decoration. Branding and/or customization of the Sleeve can become part of the social networking and social media aspects of using the Appliance, further placing this important invention into the consciousness of Society.

The Bottom of the Appliance can be constructed with two walls for thermal insulation, and optionally with a space with vacuum or a freezing agent in between the walls. In an optional embodiment, the Bottom Container may also include a false bottom which includes a cold gel, which can be cooled or frozen prior to use, to keep the milk cold for an extended period after filling. A Straw can comprise a basket at its bottom end, which can be filled with water or milk and frozen, so that the Straw keeps the milk in the milk compartment cold. Sometimes the cereal in the cereal compartment can become slightly wetted due to environmental conditions, or from the cooling effect from the milk side, or from refrigerating the snack. This could make the cereal sticky and difficult to dispense. To solve this, the Thumbwheel on the Lid may be connected to an axle that extends down toward the bottom of the Appliance where it is connected to a spoke feature on the inside the cereal compartment. Rotation of the Thumbwheel on the top will move the spoke which will break up cereal that has clumped, allowing the cereal to flow again. The Bottom can be made from thermoplastic plastic, stainless steel, cushioned glass, or combinations thereof. These options and functionalities can be included in other embodiments described throughout herein.

The Appliance is to be available in multiple sizes, typically a child's size, and an adolescent-adult size, of around 19 ounces and 26 ounces total volume respectively. The ratio of milk to cereal is typically in the range of 1.0:1.4 to 1.0:1.6. The child size Appliance is perfect for child's snack or meal, with the milk side of the Appliance accommodating a standard 8 ounce milk carton common at schools, in which case the child can bring the Appliance to school with the cereal side prefilled with cereal, obtain the milk carton at school, pour the cold fresh milk to the milk side of the Appliance, then eat the meal while playing at lunch time or during recess.

In the foregoing descriptions of variations of the invention, it should be noted that functional elements from different embodiments can be combined together in into the Appliance and need not be associated with only the embodiment in which the element is shown.

The functional elements of the Appliance described in the foregoing have significant advantages over the prior art. For example, in U.S. Pat. No. 6,264,068 an Appliance is described which is very difficult to refill, and is prone to milk spillage when the Appliance is being transported. Also dispensing the cereal is cumbersome and the user's nose is going to bump against the Appliance. In U.S. Pat. Nos. 6,913,777 and 7,063,229 Appliances are described which dispense the milk and cereal simultaneously, which is not desirable as it is impractical to control the portions to the liking of the user. Also, the U.S. Pat. No. 7,063,229 Appliance exposes the milk to the outside surface of the cereal container which may be soiled from handling. In U.S. Pat. No. 8,485,378 the Appliance requires mixing of the milk and cereal prior to dispensing the contents into one's mouth, which will make the cereal soggy and ruin its motility and freshness as the consumption of the snack progresses. The Prior Art known as "Hydra Cup" (FIG. 19) cannot be used for a milk and cereal snack because it lacks means to dispense milk and cereal properly, safely, neatly and ergonomically, and the wall that separates the two compartments, which is configured for moldability, will allow spilling of milk into the cereal compartment as this functional characteristic was not a consideration. The Prior Art "Snackeez" is in a completely different category than the Appliance in the present invention. With Snackeez, (1) the user must dispense the food using one's fingers, (2) the outside of the food cup is handled during preparation which later contacts and contaminates the beverage, (3) the beverage can be overfilled causing a mess when attaching the snack cup, and (4) it must be kept upright to prevent spillage and leakage, thus precluding clean, one-hand, mess-free, safe operation as in the present invention.

The invention claimed is:

1. A multi-compartment food and beverage storage and dispensing appliance adapted for non-simultaneous dispensing of the food and the beverage, comprising:
  (1) a bottom cup comprising:
    (a) an open top with a circumference and perimeter around the open top,
    (b) a first rim at a first portion of the perimeter,
    (c) a septum diving the bottom cup into a first and second compartment, the septum comprising:
      (i) a first side edge with a top corner at the perimeter, the top corner at a distance above the first rim,
      (ii) a second side edge with a top corner at the perimeter, the top corner at a distance above the first rim,
      (iii) a top edge at a distance above the first rim extending from the first side edge top corner to the second side edge top corner;
    (d) a second rim first ramp at a second portion of the perimeter connecting the first edge top corner to the first rim with a gradual obtuse angle over part of the circumference of the perimeter, and a third rim second ramp at a third portion of the perimeter connecting the second edge top corner to the first rim with a gradual obtuse angle over part of the circumference of the perimeter,
    wherein the top of the second compartment is defined by the septum top edge, the first rim, the second rim first ramp, and the third rim second ramp;
  (2) a lid with an outside surface and an inside surface, the lid comprising:

(a) a first section adapted to communicate with the first compartment, comprising a first opening, and a raised spout around the first opening extending from the outside surface, (b) a second section adapted to communicate with the second compartment, and to sealingly impinge the top of the second compartment, and comprising a second opening, and a valve connected to the second opening.

2. An appliance as in claim 1 wherein the lid comprises a sealing element adapted to sealingly impinge only on the top of the second compartment.

3. An appliance as in claim 1 wherein the bottom cup comprises a septum to separate the bottom cup into two cavities, and wherein the lid comprises the said valved port in communication with a first cavity and the said raised spout in communication with a second cavity.

4. An appliance as in claim 1, adapted to enable a business process of providing a meal to a consumer, the process consisting of: (1) providing to the consumer said appliance adapted to (a) store and consume a meal consisting of a solid dry food and a beverage, (b) store the solid food and beverage separately, and (c) dispense the solid food and beverage separately and non-simultaneously; (2) providing a beverage; (3) providing a solid dry food; and (4) either (a) filling either the food or the beverage or both into the appliance before time of purchase or before point of service, or (b) providing the means for filling the appliance with the beverage or the food or both, at or after or before the time of purchase or point of service.

5. An appliance as in claim 1, wherein the septum comprises a length from its first side edge to its second side edge, wherein the length is non-linear from the first side edge to the second side edge, and wherein the midpoint of the wall is offset from the center of the bottom container, the offset locating the center of the bottom container in the first compartment, and further wherein: (a) the lid inside surface first section comprises a door, the door size adapted to cover the lid first opening; (b) the bottom container first compartment comprises an area, the area sized to fit the door in a first position to cover the lid first opening and in a second position to uncover the lid first opening.

6. An appliance as in claim 1, wherein: (a) the perimeter of the food dispensing spout is oval-shaped, the oval long axis of 1.375 to 1.625 inches in length, and the oval short axis of 1.125 to 1.375 inches in length, the short axis oriented substantially collinear with a centerline radiating generally from the lid's center; (b) the spout height is variable, and is ½ to ¾ inches high at the short axis apexes, and 5/16 to 9/16 inches high at the long axis apexes; and (c) the lid first section opening and spout are in a corner of the lid first section.

7. A dry food and beverage storage and dispensing appliance for separating and preventing the mixing of a dry food and a liquid beverage while stored in the appliance, and for non-simultaneous dispensing of the dry food and liquid, the appliance comprising:
(a) a container with a closed bottom and open top, and comprising:
    i) a rim around the open top, part of the rim at a first height,
    ii) a wall intersecting the container from bottom to top, defining a first and second compartment separated by the wall, the wall having (1) a left and right edge, and (2) a top extending to a height above the rim first height from its left to right edge,
    iii) a left and right ramp connecting the left and right edge of the top of the wall to the rim of the first compartment,
(b) a lid with a top surface and a bottom surface, and comprising:
    i) a seal element on the bottom surface, the seal element adapted to make contiguous contact with the top of the container wall, the left and right ramp, and the rim of the first compartment,
    ii) a first and second side, the first side defined by the area inside the perimeter of the bottom surface seal element,
    iii) a food spout defined by an opening in the lid second side, the perimeter of the opening including a raised rim extending a distance from the lid the top surface,
    iv) a moveable door in the second side on the bottom surface, adapted to close and open the food spout opening,
    v) an opening through the first side,
(c) a straw and valve assembly adapted to pass through the lid first side opening and extending a distance from the lid top surface;
(d) a connection means to connect the lid and container together.

8. An appliance as in claim 7, wherein the wall asymmetrically intersects the container to define a second compartment's cross sectional area different than the first compartment's, and to position and fit a centroid of the container within the second compartment area.

9. An appliance as in claim 7, wherein the wall is non-linear from its left edge to its right edge, the wall shape selected from the group of: angled lines, a curve, a combination of a line and a curve.

10. An appliance as in claim 7, wherein the apex of the top of the wall is at least ¼" higher than the first compartment rim, and wherein the wall's top left and right edge corners are at least 1/16" higher than second compartment rim.

11. An appliance as in claim 7, wherein the food spout cross sectional area is oval shaped.

12. An appliance as in claim 7, further wherein (1) the food spout cross-sectional shape is oval shaped, the oval with a long axis of a first direction, (2) the straw and valve assembly on the top surface of the bid lid is angled or curved to be directed along a second direction, and (3) the included angle between the first and second direction is less than 50 degrees.

13. An appliance as in claim 7, further wherein (a) the lid second side opening and spout cross-section is generally oval-shaped, with a long axis dimension of 1.375" to 1.625" and a short axis dimension of 1.125" to 1.375", the short axis oriented substantially collinear with a centerline radiating generally from the lid's center; (b) the spout height is variable, and is ½" to ¾" at the short axis apexes, and 5/16" to 9/16" at the long axis apexes (c) the lid second side opening and spout are in a corner of the lid second side.

14. An appliance as in claim 7, further wherein (a) the lid second side comprises a corner, (b) the spout is positioned in said corner, (c) the door's size encompasses the lid second side opening, (d) the lid second side bottom surface area accommodates the door in two positions, a first position fully obstructing the spout opening and a second position fully un-obstructing the opening.

15. An appliance as in claim 7, wherein the container further comprises at least one keyway, the keyway including a ring, and the lid further comprises at least one tab aligned with the keyway, the tab comprising a groove, wherein the groove is snap-ably engage-able with the ring, and further wherein the included angle of the tab does not exceed 40 degrees.

16. An appliance as in claim 7, wherein the straw and valve assembly further comprises an elastomeric member with a curved top section and a straight bottom section, the straight section passing through and sealing with the lid second side opening and including a pocket for attachment of a tube, the curved section including a normally closed port, the port adapted to open with a mechanism selected from the group of: (a) opened by vacuum, or (b) opened by compression, or (c) opened by both vacuum and compression.

17. An appliance as in claim 7 comprising a straw and valve assembly closure mechanism, the mechanism comprising an actuator with a first at rest position and second actuated position, the at rest position automatically shutting off the straw and valve assembly to fluid flow, and the actuated position opening the straw and valve assembly to fluid flow.

18. An appliance as in claim 7 wherein the container comprises a pocket, and wherein the appliance further comprises a cold stick, the cold stick adapted to be placed in the pocket.

19. An appliance as in claim 7 wherein the top of the wall, top of the ramps and top of the first compartment rim forms a continuous ridge of multiple heights, wherein each transition angle from one height to another height is less than 45 degrees, to avoid a vertically steep section of ridge.

20. A multi-compartment food and beverage storage and dispensing appliance adapted for non-simultaneous dispensing of the food and the beverage, one-hand operation, and leak-free use, comprising:

(1) a cup comprising a dividing wall creating a first and second compartment side-by-side, wherein the wall is non-linear, and wherein the center of the wall is off-center from the cup center, (2) a lid with a top outside surface and a bottom inside surface, the inside surface comprising a divider adapted to match the dividing wall of the bottom cup, the lid comprising:

(a) a first section on one side of the divider aligned with the first compartment, and a second section on the other side of the divider aligned with the second compartment, (b) an oval shaped first opening through the first section positioned in a first corner of the first section, and a spout raised from the top outside surface around the first opening, the first opening and raised spout adapted for the flow of cereal pieces comprising a substantially elliptically shaped cross section, and the spout with a top edge with a crested profile adapted for sealing one's lips around the top of the spout, (c) a door on the bottom inside surface, movable between (i) a closed position which closes the first opening in the first corner of the first section, and (ii) an open position in the second corner of the first section, (d) a door moving lever on the top outside surface, the lever with a hub at the center of the lid and connected to the door, (e) wherein the area of the first opening of the first section permits the positioning of the door in said both closed and open positions, (f) a second opening through the second section, (g) a normally closed valve connected to the second opening, the normally closed valve with a first straight part extending a distance up from the top outside surface, and a second straight part angled at a first angle away from the center of the lid, the second straight part substantially parallel to the long oval axis of the spout, and wherein the normally closed valve is rotatable within the second opening to change the first angle to a different angle.

* * * * *